United States Patent [19]

Heckman, Jr. et al.

[11] 4,143,400
[45] Mar. 6, 1979

[54] REAL-TIME OPTICAL MAPPING SYSTEM

[75] Inventors: Paul J. Heckman, Jr., Rancho Santa Fe; Peter D. McCardell, San Diego, both of Calif.

[73] Assignee: The United States of America as represented by the Secretary of the Navy, Washington, D.C.

[21] Appl. No.: 773,878

[22] Filed: Mar. 3, 1977

[51] Int. Cl.² ............................................. H04N 3/08
[52] U.S. Cl. .................................... 358/95; 250/236; 350/6.91; 354/65; 358/109
[58] Field of Search ................... 358/95, 99, 109, 222, 358/206, 285, 292, 293; 356/4, 5; 340/4 R, 4 B, 5 MP; 350/6, 7, 285, 6.5, 6.6, 6.9, 6.91; 250/235, 236, 234; 354/65, 66, 70, 71

[56] References Cited
U.S. PATENT DOCUMENTS

| | | | |
|---|---|---|---|
| 3,019,292 | 1/1962 | John | 358/109 |
| 3,463,070 | 8/1969 | Miller et al. | 354/65 |
| 3,508,068 | 4/1970 | Harris et al. | 350/6.5 |
| 3,554,628 | 1/1971 | Kennedy | 358/109 |
| 3,555,178 | 1/1971 | Humiston et al. | 358/95 |
| 3,560,643 | 2/1971 | Love | 358/109 |
| 3,580,150 | 5/1971 | Watson et al. | 350/6.91 |
| 3,644,666 | 2/1972 | Green | 358/95 |
| 3,775,735 | 11/1973 | Funk et al. | 358/99 |

FOREIGN PATENT DOCUMENTS 2510537  9/1976 Fed. Rep. of Germany .............. 356/5

*Primary Examiner*—Robert L. Griffin
*Assistant Examiner*—Joseph A. Orsino, Jr.
*Attorney, Agent, or Firm*—Richard S. Sciascia; Ervin F. Johnston; John Stan

[57] ABSTRACT

An optical system, to be used with an illuminating source, maps objects located in an underwater environment. A first optical means is adapted to receive light from the illuminating source for transmitting the illumination to the object area to be mapped. A second optical means comprises an input means, adapted to receive reflected light from the illuminated object area, or plane; and an output means for conformally transforming images of all objects in the object plane to an image plane, located externally to the second optical means. A conformal transformation at a point is one which preserves angles between every pair of curves through the point. The optical system further comprises means located between the second optical means and the image plane for filtering or masking light propagating between the two, to thereby reduce backscatter.

10 Claims, 15 Drawing Figures

OVERALL VIEW OF THE GEOMETRY OF THE REAL TIME OPTICAL MAPPING SYSTEM.

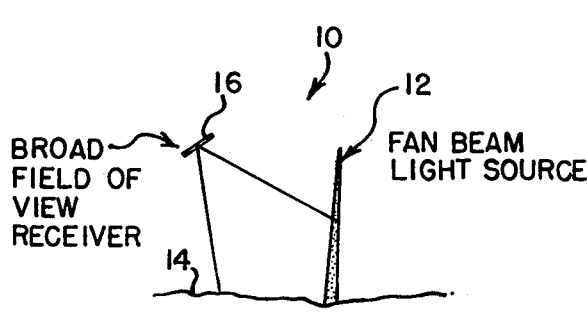
FIG. 1A.
BEAM PATTERN (NO MASK)
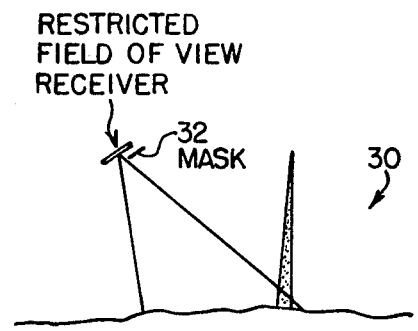
FIG. 2A.
BEAM PATTERN WITH IMAGE PLANE MASK
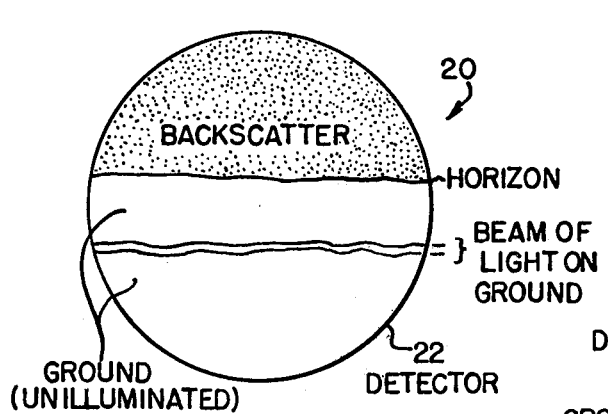
FIG. 1B. RESULTANT IMAGE
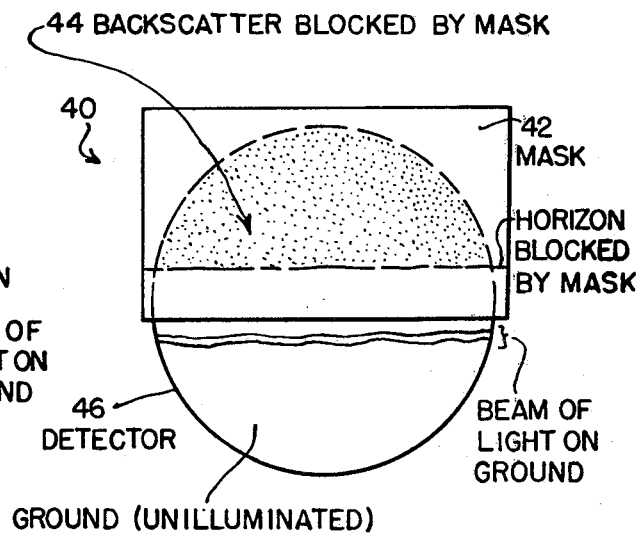
FIG. 2B. RESULTANT IMAGE USING AN IMAGE MASK GEOMETRY OF FIG. 1A PROJECTED ONTO IMAGE PLANE USING LINE-TO-CIRCLE CONFORMAL MAPPING.

USE OF CIRCULAR MASK ON LINE-TO-CIRCLE CONFORMAL MAP SYSTEM SHOWN IN FIG. 3.

Z PLANE
$z = x + iy$

A SECTION THROUGH THE OBJECT PLANE, SHOWING A VERTICAL SLICE INTO EARTH.

W PLANE
$w = u + iv$

THE IMAGE PLANE REPRESENTING THE FACE OF THE PHOTOMULTIPLIER TUBE IN THE OPTICAL SYSTEM.

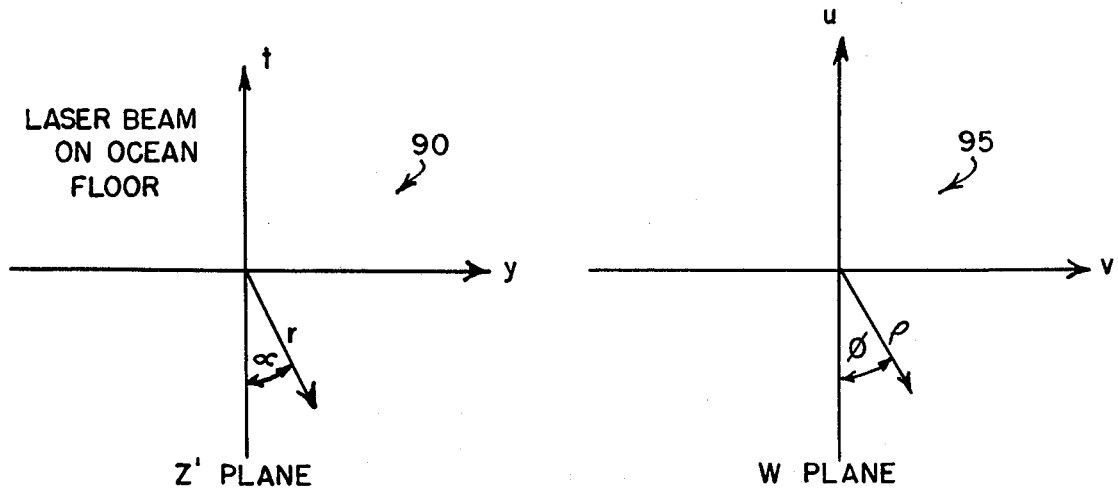
FIG. 6A.
THE OBJECT PLANE Z'
SHOWING THE PLANE OF A
FLAT OCEAN FLOOR
FIG. 6B.
IMAGE PLANE CORRESPONDING
TO THE OBJECT PLANE Z'
OF FIG. 6A
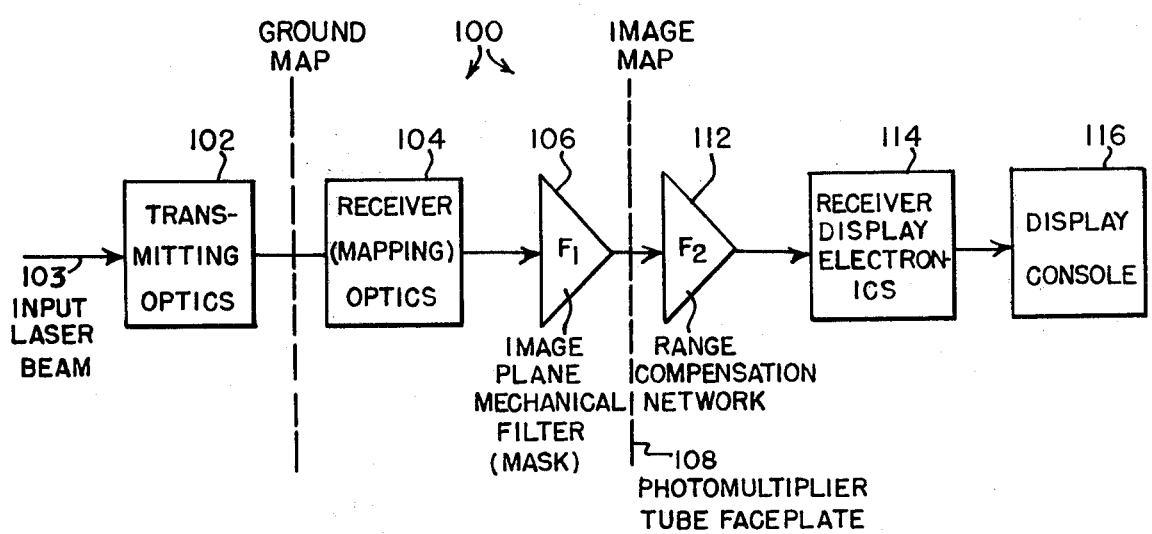
FIG. 7.
REAL TIME OPTICAL MAPPING SYSTEM

OVERALL VIEW OF THE GEOMETRY OF THE REAL TIME OPTICAL MAPPING SYSTEM.

SIMPLIFIED RECEIVER OPTICS SCHEMATIC IN THE O, $P_1$, $P_2$ PLANE SHOWN IN FIG.8.

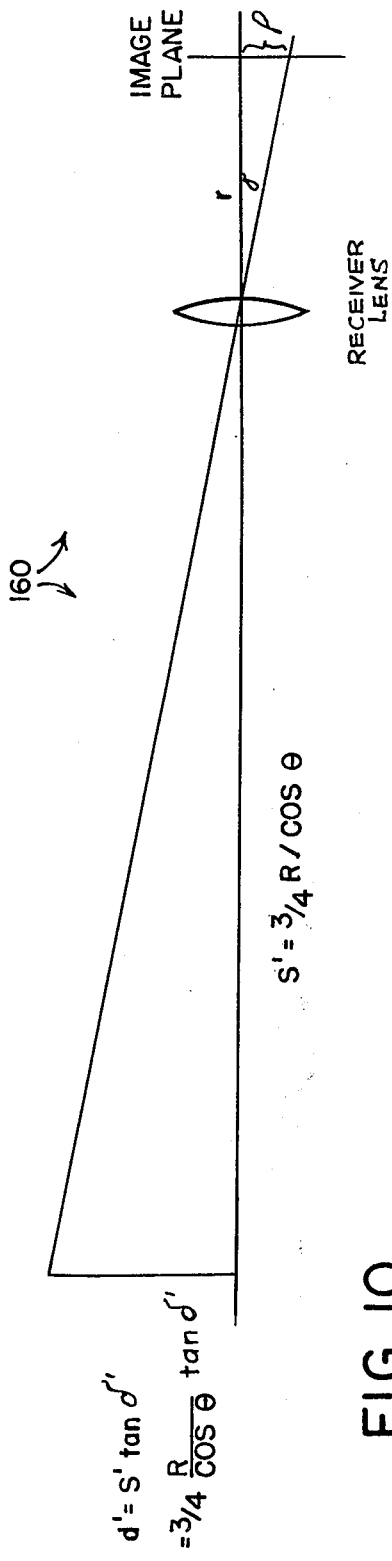
FIG. 10. SIMPLIFIED VERSION OF FIG. 9, DRAWN BY REPLACING THE AIR-WATER INTERFACE BY SUBSTITUTING EFFECTIVE DISTANCES.
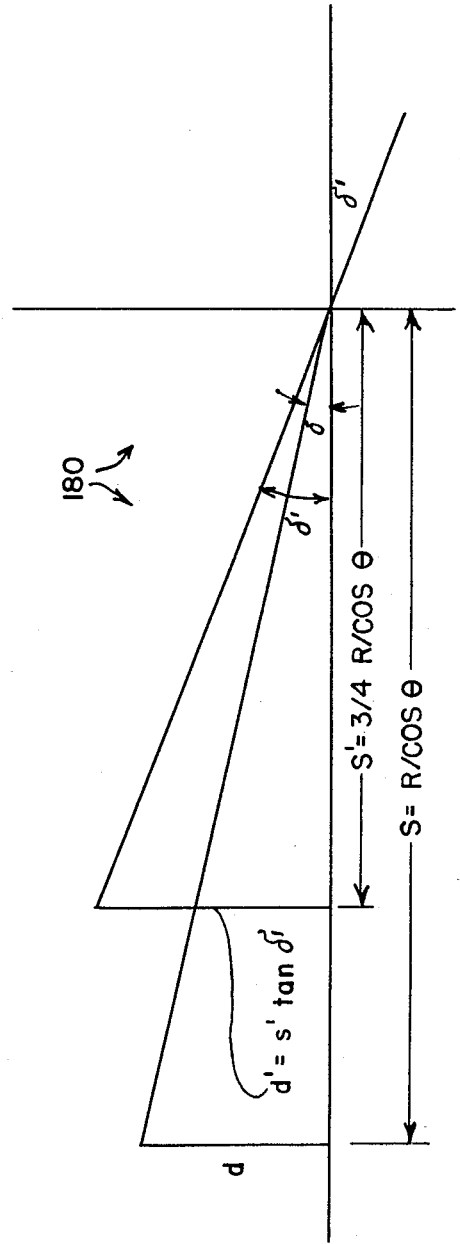
FIG. 11. CALCULATIONS OF EFFECTIVE DISTANCES FOR AIR-WATER INTERFACE.

REAL-TIME OPTICAL MAPPING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a spot scanning system capable of mapping an underwater area. In the line scanning prior art methods, every part of the line has the same intensity, for all practical purposes. However, in underwater scanning, this is not true because of the rapid attenuation of a light beam in water. A point in the middle of any line would reflect light of much greater intensity than light reflected from either end of the same line, since the distance traveled by the incident beam of light to the middle of each line is considerably less than to the ends of the same line, and hence the light intensity is attenuated less in the middle of the line. Since light attenuates exponentially underwater, this factor must be taken into consideration in any system used for underwater viewing.

This invention relates to an apparatus which optically maps underwater surfaces, may display the mapped image in real time on a cathode ray tube, or store the image in a video tape recorder. In operation, the system may be attached to either a towed or self-propelled underwater vehicle.

This invention is an improvement over the APPARATUS FOR SCANNING AN UNDERWATER AREA, described in U.S. Pat. No. 3,775,735, to Funk et al., which issued on Nov. 27, 1973. Both inventions have the same assignee. Both inventions also involve a scanning spot which rotates in a circle or an arc of a circle.

The apparatus of the invention just mentioned as well as of this invention, includes the following basic components: (1) a point light source which is spectrally optimized for underwater transmission; (2) collecting and collimating optics for the light source; (3) a dual prism and lenses mounted in a rotating cylinder; (4) receiving optics, for receiving the beam of light reflected from the target; (5) a photomultiplier tube, for converting the received beam of light into an electrical signal; (6) automatic gain control electronics, to compensate for the variable attenuation of the incident and reflected light beams; (7) a display cathode ray tube; or (8) a magnetic tape recorder, to display or record the target area; (9) a power supply, to supply energy where needed; and (10) underwater housings.

SUMMARY OF THE INVENTION

An optical system to be used with an illuminating source maps objects located in an underwater environment. A first optical means is adapted to receive light from the illuminating source, for transmitting the illumination to the object area to be mapped. A second optical means comprises an input means adapted to receive reflected light from the illuminated object area or plane; and an output means for conformally transforming images of all objects in the object plane to an image plane, located externally to the second optical means. The optical system further comprises means located between the second optical means and the image plane, for filtering or masking light propagating between the two. Means, adapted to receive illumination from the filtering means, compensate for the absorption losses of the illumination as a function of the range to various parts of the mapping area. Absorption losses can be measured in attenuation lengths $\alpha$. Typical units are logs per meter. In the system of this invention, the attenuation lengths involved are in the range of eight. Means, adapted to receive illumination from the compensating means, reverse the effects of the conformal mapping, to produce an image which is an accurate representation of objects in their underwater environment. The means may comprise a photomultiplier tube, which receives a light signal whose intensity changes with time. Means, adapted to receive the image from the reversing means, display the underwater objects in real time, for example, on a television screen.

OBJECTS OF THE INVENTION

An object of the invention is to provide a system for scanning an underwater area, which may be used either on a moving vehicle or on a stationary platform.

Another object of the invention is to provide a system for scanning an underwater object which compensates for the differences in length of the beam path at various parts of the linear scan.

Yet another object of the invention is to provide a system which minimizes backscatter effects.

These and other objects of the invention will become more readily apparent from the ensuing specification when taken together with the drawings.

BRIEF DESCRIPTION OF THE DRAWINGS

FIG. 1 comprises a pair of diagrams, FIG. 1A showing a beam pattern with no mask, and FIG. 1B showing the resultant image.

FIG. 2 is a pair of diagrams, comprising FIG. 2A, which shows a beam pattern with an image plane mask, and FIG. 2B, which shows the resultant image using the mask.

FIG. 6 comprises a pair of coordinate systems, FIG. 6A illustrating the object plane z' showing the plane of a flat ocean floor, and FIG. 6B illustrates the image plane corresponding to the object plane z' of FIG. 6A.

FIG. 7 is a block diagram of the real time optical mapping system of this invention.

FIG. 10 is a simplified diagram of FIG. 9, drawn by replacing the air-water interface by substituting the effective distances.

FIG. 11 is a diagram, similar to that shown in FIG. 10, which facilitates calculations of effective distances for air-water interface.

DESCRIPTION OF THE PREFERRED EMBODIMENTS

Figure 3:
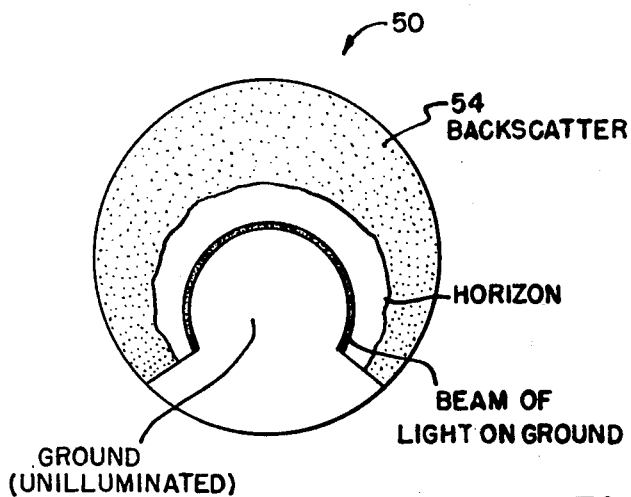
FIG. 3 is a diagram showing the geometry of FIG. 1A projected onto the image plane, using line-to-circle conformal mapping.

Before discussing the invention in detail, a few remarks will be directed to the backscatter reduction mechanism. Referring to FIG. 1, consider an optical system 10 producing a fan beam of light 12 which impinges upon the ground 14 (FIG. 1A). The lens 16 of a wide angle camera then focuses the object plane (the ground 14) onto the image plane and produces the image 20 shown in FIG. 1B. Here the backscatter is allowed to impinge upon a detector 22, and thereby degrades the signal-to-noise ratio, as manifested in a lowered contrast ratio of the output image.

On the other hand, if the field of view of the same system 20 were to be restricted through the use of a mechanical mask 32 in the image plane (see FIG. 2A), an image would be produced such as is shown in FIG. 2B. Here, the mask 42 prevents the backscattered light 44 from reaching the detector 46. Now if the received image is not to be viewed directly but is only an intermediate step in detecting the returning signals, ordering them, and transmitting them to a remote display system, it is possible to project a distorted image on the detector providing it is possible to reorder it later. Thus one could conformally map the image on the detector and yet display a good, processed image on a display console. A conformal mapping is a mapping of intersecting lines in one plane, a z plane, into another plane, a w plane, in which the angles of intersection are preserved.

Using the appropriate optics system, therefore, one could project the image of the beam pattern 20 shown in FIG. 1B to the image 50 shown in FIG. 3. The backscatter 54 displayed on this image 50 (FIG. 3) could easily be removed using a circular aperture mask 62 as shown in FIG. 4.

Other optical systems might be used to provide alternate conformed maps of a line or point beam pattern on the ground, which could in turn be shielded from impinging backscatter through the use of other electromechanical masks controlled by a display console operator.

The choice of the conformal mapping scheme in any optical imaging system design would depend upon: (a) the simplicity of mask design; (b) the simplicity of the optics necessary to perform the conformal transformation; (c) the efficiency of the optics system necessary to perform the transformation; (d) the ease of retransforming the map into a usable image; and (e) general system tradeoffs.

Figure 4:
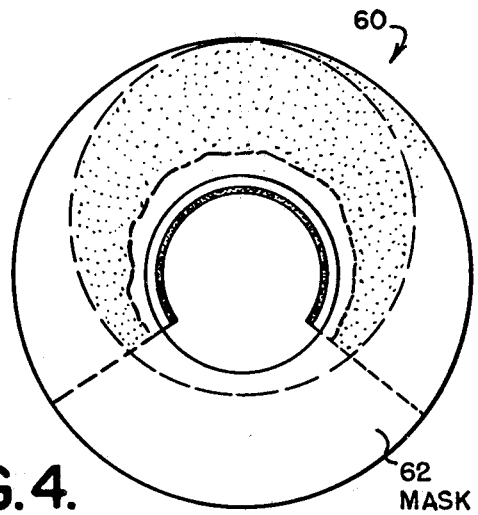
FIG. 4 is a diagram showing a circular mask superimposed upon the line-to-circle conformal map system shown in FIG. 3.

The particular system described in FIG. 3 and 4 is, in fact, the conformal mapping scheme used in a system actually built.

Figure 5A:
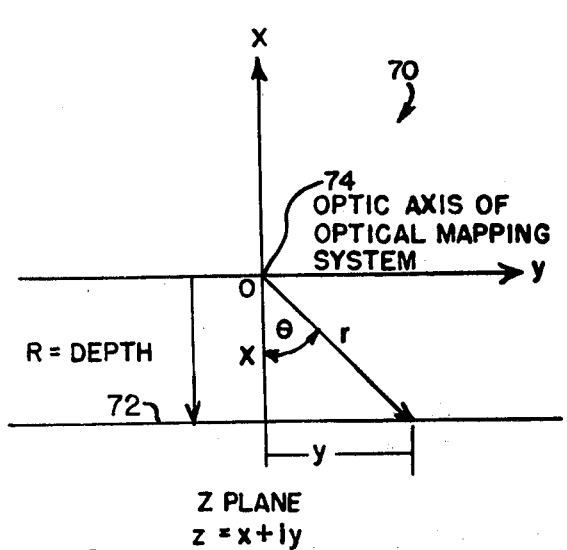
FIG. 5 comprises a pair of coordinate systems, FIG. 5A showing a section through the object plane, showing a vertical slice into the earth.
FIG. 5B shows the image plane representing the face of the photomultiplier in the optical system.
Figure 5B:
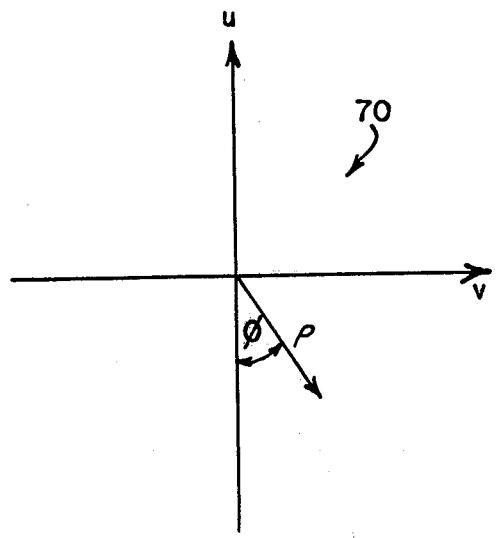

It will be instructional to determine the actual complex transformation by relating the object plane to the image plane of the optical system. To facilitate the determination of this relationship, a complex Cartesian coordinate system may be defined as shown in FIGS. 5A and 5B. FIG. 5A represents the object plane 70, or z plane, where X is the altitude off the bottom 72, Y is the direction of the scan line on the ocean floor, and the origin is situated at the center of the optic axis 74 of the optical system.

Figure 8:
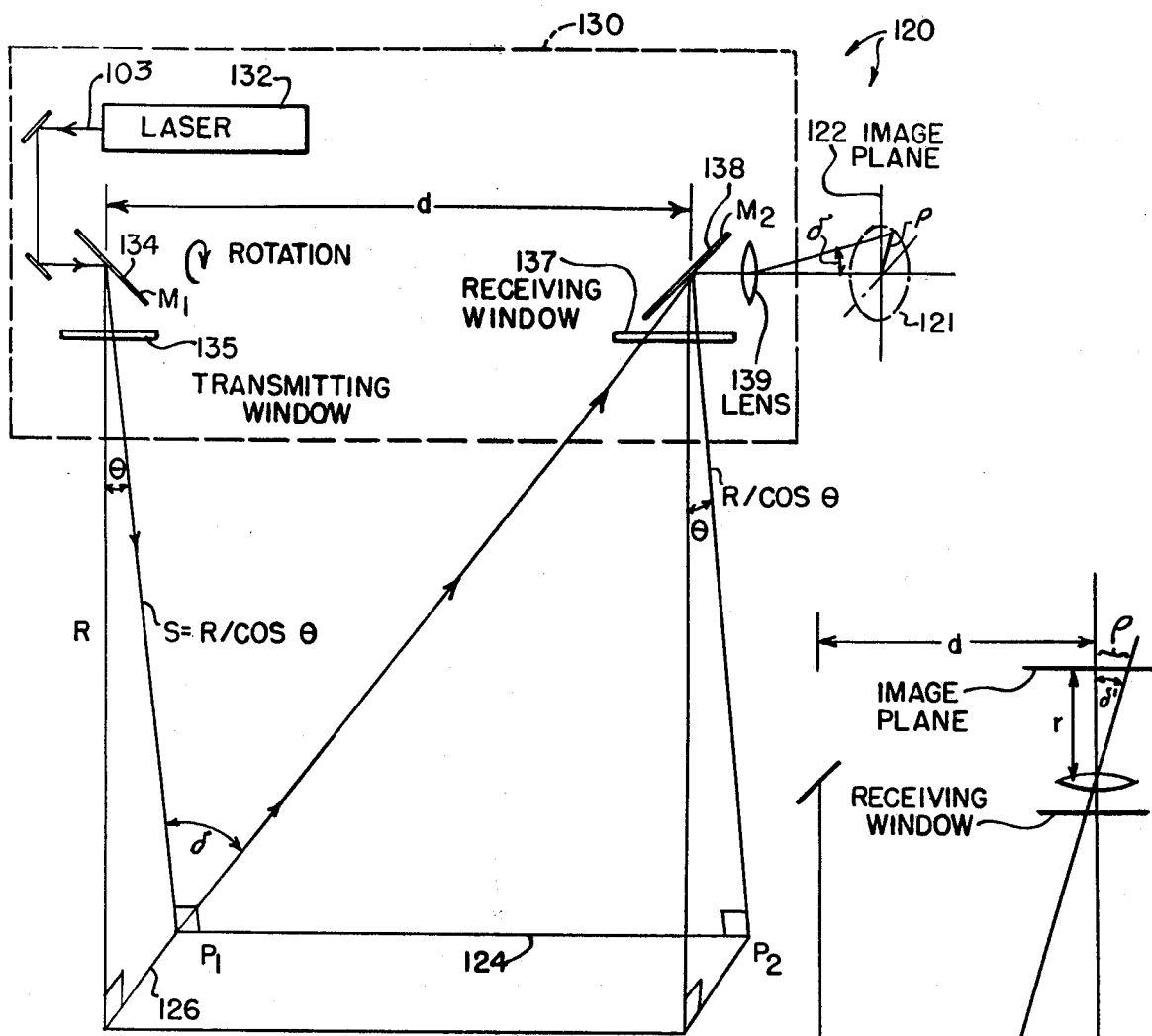
FIG. 8 is a diagram showing the overall view of the geometry of the real-time optical mapping system.

The transformation of this one altitude plane to the image plane w is shown in FIG. 5B. It may be shown that:

$$\rho(\theta) \simeq \frac{4}{3} \frac{fd}{R} \cos \theta \quad (1)$$

where
- $\rho(\theta)$ is the polar plot of the irradiance incident upon a photomultiplier tube faceplate (i.e. w plane in polar coordinates);
- the fraction $4/3$ = the ratio $n_2/n_1$ = the ratio of the index of refraction of water to air; and
- f = lens focal length in meters, typically 0.75m, with the receiver apertures quite large;
- d = separation distance of transmitting and receiving mirror in meters, typically 1.25m;
- R = perpendicular distance to ocean bottom in meters, typically 40m; and
- $\theta$ = sweep angle in radians, typically 2.09 radians. These parameters are shown in FIG. 8, to be discussed hereinbelow.

Grouping the system constants together, and substituting $R = -X$ as in FIG. 5A, Eqs. (2) and (3) are obtained:

$$A = \frac{4fd}{3}, \quad (2)$$

where A is the gain or magnification of the transformation; and $$\rho(\theta) = \frac{A}{-X} \cos \theta \quad (3)$$

These equations are actually a mixture of a Cartesian and polar coordinate nomenclature. Changing totally to polar coordinates, from FIG. 5A it may be seen that $$X = r \cos \theta \quad (4)$$

and $$\rho = \frac{A}{r} \angle 180° \quad (5)$$

Thus $$\rho = A/r \quad (6)$$

and $$\phi = -\theta \quad (7)$$

or, in Cartesian coordinates this is $$W = \frac{A}{Z} \text{ where } A = \frac{4fd}{3} \quad (8)$$

Equations (4) through (8) are the standard reciprocal transformation relationships found in the study of conformal mapping. They have the property that circles (including straight lines as "circles through $\infty$") map into circles. If the line is finite in length, the resulting transformation provides a circle that does not close on itself i.e. will map into a segment of a circle. Equations (4) through (8) to indeed represent the entire transformation between the vertical X, Y plane and the image U, V plane. This will be all that is mapped onto the image plane if all of the light from the bottom falls in that single line separated a distance d from the center of the receiver mirror. However, optics systems using lenses map a three-dimensional object field into a two dimensional image field. And, if there is other light illuminating the ocean floor or if the beam of light illuminating that floor does not traverse a straight line, the imaging system will also map that plane onto the image plane or W plane.

Therefore, consider a flat ocean bottom where the depth, R, is constant. Referring to FIG. 6A, define the ocean floor to lie in the Y, T plane. Use is made of Eq. (9), which is similar to Eq. (1).

$$\rho = \frac{4 f d'}{3 R} \cos \theta, \tag{9}$$

where d' is the effective distance d as seen through the flat, air-water, interface. Although d referred previously to the source-receiver separation distance, it was used to denote the distance between the line on the ocean floor and the center of the receiver mirror projected onto the bottom as a reference point (i.e. $t = d = $ fixed constant). Since d' is now an independent variable, it can be denoted by T, recognizing that this is the apparent distance on the ground. Changing totally to rectangular coordinates, and utilizing the relations shown in FIG. 5A, the following equations are obtained:

$$\rho = \frac{4 f t}{3} \frac{\cos \theta}{R} = \frac{4 f t}{3} \frac{1}{\sqrt{y^2 + x^2}} \tag{10}$$

or $$\rho = \sqrt{u^2 + v^2} = \frac{4 f t}{3} \frac{1}{\sqrt{x^2 + y^2}} \tag{11}$$

or $$|W| = \frac{4 f}{3} t \frac{1}{|Z|} = B t \frac{1}{|Z|} \tag{12}$$

Thus, Eq. (12) states that as the line of light on the bottom is moved further away from the receiver optic axis, the conformal map in the image plane is a circle whose size is directly proportional to the effective distance t as seen through the air water interface.

The significance of the above calculations in practical design applications can be seen from the optical system 100 shown in FIG. 7. Transmitting optics 102 implements a mapping function which changes the spot produced by a collimated beam 103 of the laser into a line of light on the ocean floor. The receiving optics 104, the equation of which is Eq. (14) above, conformally maps a line of light on the ocean bottom into a circle of light in the image plane $F_1$, the equation for which is $A = 0$ for $\rho >$ constant, is the image plane mechanical filter which prevents the backscatter from reaching the photomultiplier tube faceplate at 108.

The range compensation network 112 is an inverse filter to compensate for the general $e^{-\alpha R}$ absorption losses as a function of range.

The receiver display electronics 114 implements the transform of the mapping function which maps the circles on the image plane back into straight lines on the receiver display console 116. This particular function is accomplished electronically in a system which was built.

It is constructive to consider what a different transmitting optics 102 might do to the complexity of the system 100. If the transformation were such that it mapped a semicircle on the ocean floor rather than a straight line, this would then eliminate the changing R/cos term of the receiving optics 104, and thus the range compensation network 112 in FIG. 7 could be eliminated. This would tremendously simplify the receiving electronics 114. Unfortunately, because the implementation of Eq. 13 by the receiving optics 104 is no longer a simple reciprocal relationship (because t is no longer a fixed constant), circles will no longer map into circles, and the shape of the mask would no longer be a simple, round, aperture.

Referring now to FIG. 8, therein is shown a rotating apparatus 130 comprising a laser 132, first, mirror 134, transmitting window 135, receiving window 137, second mirror 138, and lens 139. As the apparatus 130 rotates, each line scanned on the ocean bottom, for example line 126, is reproduced as a circle, or, generally, an arc of a circle, 121, on the image plane 122.

The rotation takes place about the axis through lens 139. As the linear mapping in the object plane proceeds from the left end of line 126 to the right end, at $P_1$, an arc of a circle is traced on the image plane 122.

The angle $\delta$ can be conveniently chosen to be 45°. The term f, in various equations, is the distance from lens 139 to the image plane 122.

Explained hereinbelow is a calculation of the light projected by the receiver optics 104 of FIG. 7, of the optical system 100, onto the image plane 122 of FIG. 8 as a function of the line of light 124 on the ocean floor.

Figure 9:
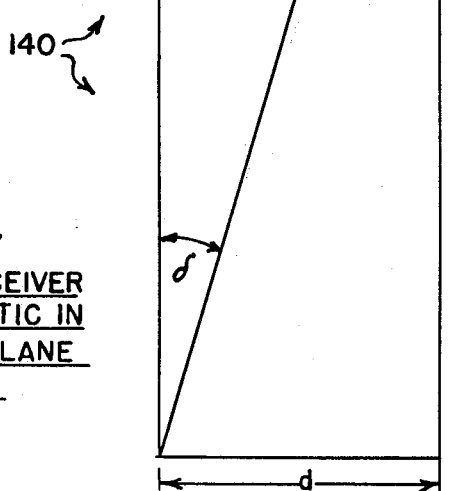
FIG. 9 is a diagram of a section of the mapping system shown in FIG. 8, somewhat modified.

Reference is now directed to the overall view of the geometry of the optical system 120 sketched out in FIG. 8. If now this geometry is transposed into a two dimensional schematic in the plane O, $P_1$, $P_2$, and the optic path is straightened by eliminating the 90° angle caused by $M_2$, the diagram shown in FIG. 9 results. It is desired to relate $\rho$ in terms of R, $\theta$, d and f. It will be noted that FIG. 9 could be redrawn to eliminate the effects of the flat air-water interface, as is shown in FIG. 10. The calculation of the effective distances shown in FIG. 10 can be simplified by referring to FIG. 11. It will be noted that $$s' = \frac{n_1}{n_2} s \tag{14}$$

where $$s = R/\cos \theta \tag{15}$$

A typical distance for R would be 40 meters. Since $n_1/n_2$ is assumed to be equal to 3/4, $$s = \frac{3 R}{4 \cos \theta} \tag{16}$$

It will be noted also from FIGS. 10 and 11, that $$d' = s' \tan \delta' \tag{17}$$

In summary, in the optical system 100, of this invention the receiver optics 104 conformally maps the three-dimensional object plane of the ocean floor onto a two-dimensional image plane, in accordance with Eq. 13. For a given vertical plane through the ocean floor, this transformation has the property that it maps lines into circles and circles into circles. It was noted hereinabove that a circular scanning system could utilize the same receiver optics but that the mask would have to be modified considerably. However, such a circular scan would eliminate the necessity of using complex range compensation circuitry 112 to get rid of the effects of the varying R/cos θ attenuation losses of a line scan system.

In addition, block diagrams incorporating the effects of spacial filters 106, optical and electronic conformal transformations and amplitude filters 112, such as that shown in FIG. 7 can be useful to see the effects of changes in the electro-optical system design.

Referring to FIG. 10 and using the lens equation, $$\frac{1}{r} + \frac{1}{s} = \frac{1}{f}, \tag{18}$$

leads to $$r = \frac{fs'}{s' - f} = \frac{3fR}{3R - 4f\cos\theta} \tag{19}$$

by use of Eq. (16).

It will be noted also that, in FIG. 10, $$\rho = \frac{rd'}{s'} = r \tan \delta \tag{20}$$

$$= \frac{3fR - \tan \delta'}{3R - 4f\cos\theta} \tag{21}$$

by use of Eq. (19).

If δ and δ' are small, as may be seen from FIG. 11, $$\tan \delta' = \tan \frac{4}{3} \delta = \tan \frac{4}{3} \frac{d \cos \theta}{R}; \tag{22}$$

and since $$\frac{d \cos \theta}{R} \approx \frac{3}{20} \tag{23}$$

is small, then $$\tan \delta \approx \frac{4}{3} \frac{d \cos \theta}{R} \tag{24}$$

$$\text{and } \delta \approx \frac{4fd\cos\theta}{3R - 4f\cos\theta}, \tag{25}$$

by use of Eqs. (21) and (24).

If, in addition, $$f << R \tag{26}$$

$$\rho \approx \frac{4fd\cos\theta}{3R} \tag{27}$$

Although Eq. (27) is useful for small angles, another expression can be derived from Eqs. (20) and (16) which are useful for envisioning the resultant pattern for large δ.

$$\rho = \frac{rd'}{s'} = \frac{4rd'}{3R} \cos \theta \tag{28}$$

If R is large compared to r, then $$r \approx f \tag{29}$$

= the focal length of the lens, and $$\rho \approx \frac{4fd'}{3R} \cos \theta \tag{30}$$

Obviously, many modifications and variations of the present invention are possible in the light of the above teachings, and, it is therefore understood that within the scope of the disclosed inventive concept, the invention may be practiced otherwise than specifically described.

What is claimed is:

1. An optical system, to be used with a light source, for mapping objects located in an underwater environment, comprising:
   a first optical means, adapted to receive light from the light source, for transmitting the light produced by the light source to the object area to be mapped, thereby illuminating the area; and
   a second optical means comprising:
      an input means, adapted to receive reflected light from the illuminated object area, or plane;
      an output means for conformally transforming, that is, conformally mapping, images of all objects in the object plane to an image plane located externally of the second optical means; and
      means, disposed between the second optical means and the image plane, for masking light propagating between the optical means and the image plane, the masking means having a circular configuration.

2. The optical system according to claim 1, further comprising:
   means, adapted to receive illumination from the masking means, for reversing the effects of the conformal mapping, that is, for performing an inverse transformation, to result in an image which is an accurate representation of objects in their underwater environment.

3. The optical system according to claim 2, further comprising:
   means, adapted to receive the image from the inverse transformation means, for displaying the underwater objects in real time.

4. The optical system according to claim 3, further comprising:
   the illumination source.

5. The optical system according to claim 4, wherein: the illumination source is a laser.

6. The optical system according to claim 5, wherein: the inverse transformation means comprises a photomultiplier.

7. The optical system according to claim 6, wherein: the displaying means comprises a television system.

8. The optical system according to claim 1, wherein: the first and second optical means comprise means which rotate about an axis parallel to the surface of water.

9. The optical system according to claim 8, wherein the first optical means comprises:
   a first mirror, adapted to receive light from the illumination source, which is capable of pivoting about an axis perpendicular to the axis of rotation; and
   a transmitting window, adapted to receive the light from the first mirror and pass it through to the object area.

10. The optical system according to claim 9, wherein the second optical means comprises:
    an input means which comprises:
    a receiving window, adapted to receive and then transmit light from the object plane; and
    a second mirror, adapted to receive light from the receiving window; and wherein:
    the output means comprises a focusing lens, adapted to receive light from the second mirror and focus it upon the image plane.

* * * * *